United States Patent [19]

Wyss

[11] 4,243,616
[45] Jan. 6, 1981

[54] AIR DIFFUSER

[76] Inventor: Ronald Wyss, R.R. 1, Box 1, Ada, Ohio 45810

[21] Appl. No.: 12,317

[22] Filed: Feb. 15, 1979

[51] Int. Cl.³ .............................................. B01F 3/04
[52] U.S. Cl. .................................. 261/122; 239/145; 239/533.13; 239/571; 261/124
[58] Field of Search .............. 261/62, 122, 124, 64 B, 261/DIG. 70; 239/58, 145, 533.13, 570, 571

[56] References Cited

U.S. PATENT DOCUMENTS

| | | | |
|---|---|---|---|
| 2,430,749 | 11/1947 | Van Denburg | 261/122 |
| 2,687,287 | 8/1954 | Coppock | 261/124 |
| 3,206,178 | 9/1965 | Lamb | 261/122 |
| 3,429,125 | 2/1969 | Shotton | 239/145 X |
| 3,441,216 | 4/1969 | Good | 239/145 |
| 3,603,509 | 9/1971 | Nechine | 261/122 X |
| 3,977,606 | 8/1976 | Wyss | 261/122 X |
| 4,060,486 | 11/1977 | Schreiber | 261/122 X |

FOREIGN PATENT DOCUMENTS

| | | | |
|---|---|---|---|
| 856225 | 6/1940 | France | 261/122 |
| 393551 | 6/1933 | United Kingdom | 261/124 |
| 638185 | 5/1950 | United Kingdom | 261/122 |

Primary Examiner—Richard L. Chiesa
Attorney, Agent, or Firm—Jerome P. Bloom

[57] ABSTRACT

Diffuser apparatus comprises a frame including end portions interconnected by and integrated with an elongate intermediate portion. The intermediate portion is formed to produce a longitudinally extended trough, preferably of generally hemi-cylindrical configuration. The diffuser sleeve which mounts about and the length of the frame is longer than the frame and its excess length is used to provide reversibly bent extremities which produce a double layer of the sleeve thickness in areas thereof which overlie the frame end portions. The latter have circumferentially and longitudinally spaced ribs to which the double layered sleeve end portions are clamped to produce a positive and insured seal as between the sleeve and the frame at their end portions. One end portion of the frame has a through bore outwardly extended by an integral adapter to which a line connected to a source of fluid under pressure may be directly coupled. The discharge end of the bore which is innermost of the frame is intersected by aerodynamically shaped partitions arranged to smoothly divide a pressured flow of fluid into small jets which exit from the end portion to the chamber bounded by the sleeve and the intermediate trough-shaped portion of the frame. The surface in which the discharge end of the bore lies is inclined to and away from the base of the trough portion of the frame and mounts a reed type valve element a tongue-like portion of which depends over the inclined surface and the edges of the partitions in the bore which are innermost of the frame. The arrangement is such to insure an automatic seal of the bore in absence of the flow through the bore of fluid under a predetermined pressure.

19 Claims, 6 Drawing Figures

U.S. Patent  Jan. 6, 1981  4,243,616
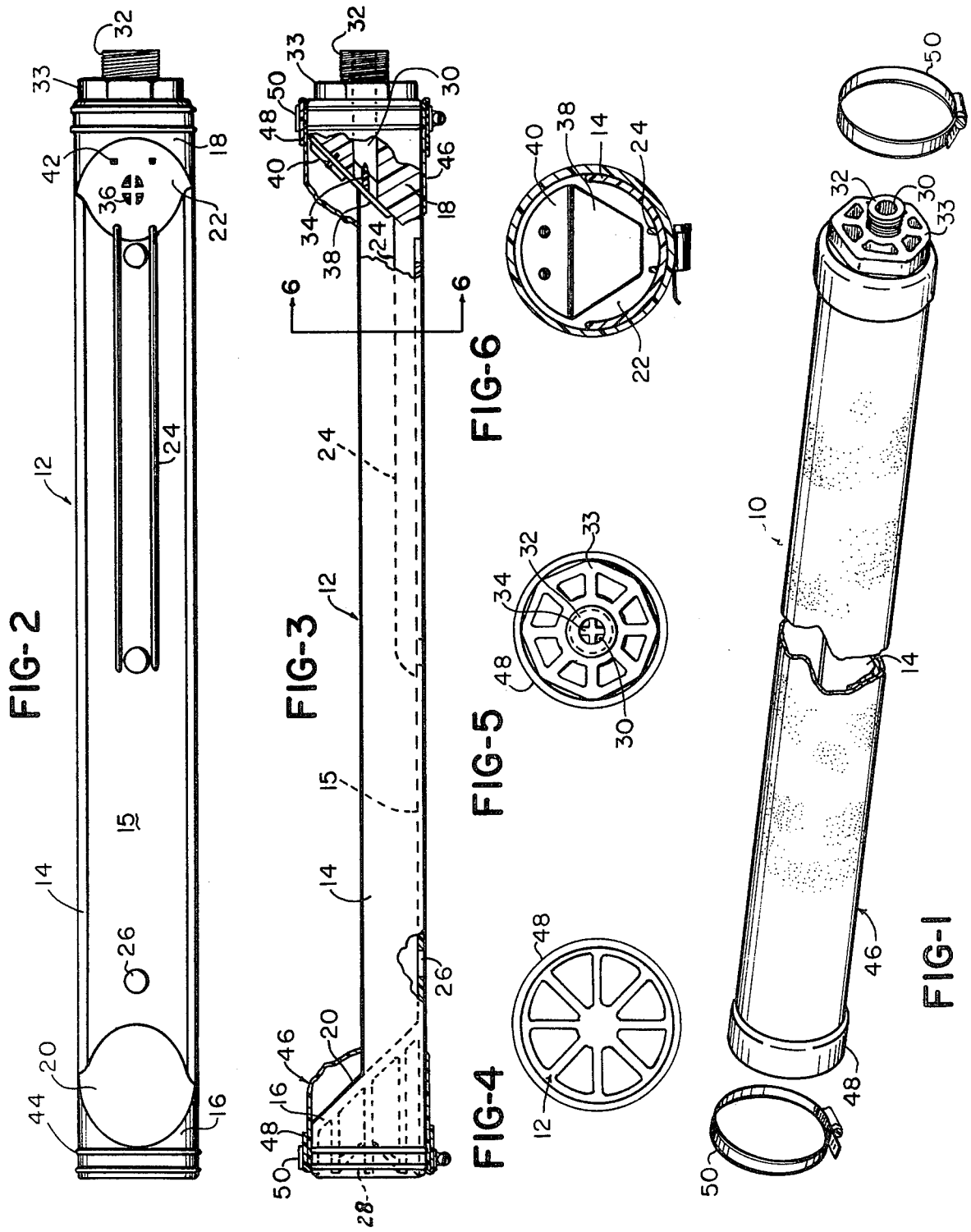

AIR DIFFUSER

BACKGROUND OF THE INVENTION

This invention relates to air diffusers and like devices and more particularly to improvements in a diffuser of the type subject of U.S. Pat. No. 3,977,606 and the components thereof.

Its features simplify the fabrication and assembly of an air diffuser, making it a more durable and more efficiently functioning unit. Embodiments include a rugged one-piece frame having an improved valve construction the design of which provides for a smooth non-turbulent delivery of air, under pressure, to the interior of the diffuser unit of which it forms a basic part. The frame mounts a diffuser sleeve of an improved nature also. This sleeve is somewhat of a nature similar to that disclosed in said U.S. Pat. No. 3,977,606, through which air delivered interiorly of the frame may exit as a multitude of needle-like jets, but here in an area thereof which lies between the ends of the frame. With the diffuser of the present invention, the sleeve is arranged to have portions which overlie the end portions of the frame which are free of any puncture or aperture and to include extensions which define the extremities thereof arranged to be folded back on the adjacent portions of the sleeve to give a multi-layered effect to the respective ends of the sleeve as it mounts to the frame. The layered ends of the sleeve are disposed over circumferential, longitudinally spaced, ribs on the outer surface of the respective end portions of the frame and surrounded, in turn, by circumferential clamps which insure a tight seal between the ribs and the sleeve. The arrangement is such to preclude access to or from the interior of the diffuser unit by way of the sleeve ends.

Neither the improved rugged, durable construction of the basic frame, nor the means which provides for a more efficient control of air under pressure which enters the frame of the invention is evidenced or anticipated in the most pertinent available prior art, the extent of which, to the inventor's knowledge, comprises the following:

| Carl Dummann | 3,626,500 | Dec. 7, 1971 |
| R. J. Good | 3,441,216 | April 29, 1969 |
| S. G. Y. Gamer | 3,416,776 | Dec. 17, 1968 |
| R. J. Kingbeil et al | 3,315,895 | April 25, 1967 |
| M. A. Lamb | 2,815,943 | Dec. 10, 1957 |
| J. W. Van Denburg | 2,430,749 | Nov. 11, 1947 |
| C. E. Ford | 2,294,973 | Sept. 8, 1942 |
| I. Coleman | 2,250,295 | July 22, 1941 |
| Keyrouse | 1,187,533 | June 1916 |
| Korwin | 2,771,320 | November 1956 |
| Ross et al | 3,186,644 | June 1965 |
| Hinde | 3,293,861 | December 1966 |
| Danjes et al | 3,642,260 | February 1972 |
| Bastiaanse | 3,677,936 | July 1972 |
| Day | 3,857,910 | December 1974 |
| Dudis et al | 3,880,965 | April 1975 |

Nor does the prior art indicate the positive valving features of the invention construction which assures swift and sure opening and closing of its valving portion. Nor can one find in the prior art a sleeve which is arranged and coupled to a frame as herein set forth. At the same time, the invention contributes to the solution of certain problems which have existed in the art and answers important needs in a manner to advance the art with which we are here concerned.

SUMMARY OF THE INVENTION

As herein illustrated the invention embodiment features a one-piece diffuser frame which in its entirety can be fabricated of plastic in a single molding operation. Other than by reason of its requirement for attachment of a diffuser sleeve, the only attachments required for the frame are a simple reed type valve element and a line communicating with a source of fluid such as air under pressure. The fabrication of the frame requires no afterboring or drilling for application of the valving element or sleeve. In the preferred configuration illustrated, the invention frame comprises an intermediate longitudinally extending hemi-cylindrical trough-like portion, having drainage holes, integrated with each of the respective ends of which are frame portions relatively adjacent surfaces of which are sloped so as to incline to and diverge from the base of the trough. One of the integrated end portions has a central bore axially extended by an integrated adapter providing for a coupling thereof to a line for delivering fluid such as air under pressure. The innermost end of the bore has formed integral with the wall thereof a pair of intersecting partitions at right angles to each other to create jet openings from the bore to the trough portion of the frame. A reed type flapper is connected at one end to the inclined surface from which the inner end of said bore opens. The flapper has a tongue-like form and is arranged to fully seal to the underlying inclined surface and the bridging partitions at the adjacent inner end of the bore so as to provide a complete seal of the bore absent a predetermined flow therefrom of air under a predetermined level of pressure.

The sleeve which mounts about the frame to complete the diffuser unit has a length greater than the diffuser unit to provide for extremities thereof to be doubled back on the adjacent portions of the sleeve which mount about the end portions of the frame. Those portions of the sleeve which mount about the end portions of the frame are impermeable and free of any puncture or apertures while that portion of the sleeve disposing intermediate the integrated end portions of the frame have a multitude of microscopic punctures of a nature as disclosed in the aforementioned U.S. Pat. No. 3,977,606. The integrated end portions of the frame include circumferential ribs which are longitudinally spaced, against which the folded-over ends of the sleeve are clamped to inhibit displacement from the frame, under pressure, of the air or other fluid which is applied to the interior of the sleeve.

A primary object of the invention is to provide a unit for diffusing a gaseous fluid in a body of liquid, and components thereof, particularly advantageous for use as or in an air diffuser, featuring economy of fabrication, efficiency in use, adaptability to a wide variety of applications and a substantially malfunction-free operation.

Another object is to provide a more rugged and more efficient frame for an air diffuser or like device.

A further object is to provide a frame for an air diffuser with an improved valving system featuring quick and precise opening and closing patterns and inhibiting backflow through the frame.

An additional object is to provide a diffuser device embodying an air delivery chamber and means to insure delivery to and from said chamber, by way of a sleeve embodying relatively uniform microscopic openings of a plurality of needle-like jets limited in extent and arranged in a manner to facilitate dispersion of the jets in a body of surrounding liquid and/or relatively solid materials.

Another object is to provide an air diffuser unit the construction and relation of the components of which are such to inhibit a plugging inflow and backflow therethrough.

A further object of the invention is to provide a diffuser assembly and components thereof possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein is shown one but not necessarily all the forms of embodiment of the invention, FIG. 1 is a perspective view of a diffuser unit in accordance with the present invention;

FIG. 2 is a top view of the diffuser frame embodied in the unit of FIG. 1;

FIG. 3 is a side elevation view of a diffuser unit in accordance with the invention with parts broken away to show features of the frame and the embodied valve element;

FIGS. 4 and 5 are views of the respective ends of the diffuser frame; and

FIG. 6 is a sectional view taken on line 6—6 of FIG. 3.

Like parts are indicated by similar characters of reference throughout the several views.

As illustrated, the diffuser tube 10 of the invention includes a frame 12 comprised of a central section 14 having the form of a longitudinally extended generally hemi-cylindrically configured shell. The frame 12 is completed by end sections 16 and 18 arranged coaxially with and in an integrated relation to the respective ends of the section 14. The section 14 is formed on a generally uniform radius and its transversely disposed extent is made approximately 180°. For the purpose of this description, the portion 15 of the section 14 which is centered between its lateral extremities and which is extended by surface portions of the end sections 16 and 18 will be considered the bottom of the frame, having regard for the attitude of the frame as shown in the accompanying drawings.

The remote ends of the frame section 14 are inclined at an approximately 45° angle to the bottom 15 and arranged to diverge upwardly therefrom as they respectively merge with the similarly inclined integrated adjacent end surfaces 20 and 22 of the respective end sections 16 and 18.

The sections 16 and 18 have a generally cylindrical outer configuration distinguished by the inclination of their most adjacent surfaces 20 and 22 and have a relatively limited axial extent.

As here provided the surfaces 20 and 22 are upwardly and outwardly divergent generally oval end walls for the generally hemi-cylindrical trough defined therebetween by the configuration of the section 14. The surfaces 20 and 22 extend above and beyond the lateral extremities of those portions of the shell-like section 14 which define the upper limits of the side walls of the trough.

Thus, the frame 12 has a generally cylindrical overall configuration interrupted intermediate its ends by the limitation of the generally hemi-cylindrical configuration of the intermediate section 14.

The interior surface of the section 14 has two slightly projected ribs 24 extending longitudinally thereof, approximately one-half its length, from the surface 22. The ribs 24 are parallel and arranged to be immediately of, parallel to and to either side of the lateral center or bottom line of the trough defined by the length of the section 14. As shown, the bottom of the trough has three drain holes 26 along its length, the dimension of each of which makes it fall within the boundaries of the ribs 24 or line extensions thereof.

The frame end portion 16 is solid and imperforate and has its outer end face provided with a conical recess 28 the wall surface of which incorporates a series of radial ribs the outer projected extremities of which also outline a conical recess, but one of limited depth.

The frame end portion 18 is also solid but has a central longitudinally extending through bore 30, the outermost end of which is extended outwardly of the main body of the frame by an integral coaxial, tubular, externally threaded adapter 32. At the base of adapter 32 and peripherally thereof is a hex nut molded configuration 33 formed integral with and projected from the outer end face of the frame defined by its end section 18.

The innermost end of the bore 30 has its peripheral bounding wall surface, for a short axial extent thereof, bridged by integrated, intersecting, diametral partitions 34 which are at right angles to each other and form small jet delivery apertures 36. The edges of partitions 34 innermost of the bore are feathered to give the partitions aerodynamic configurations.

The opening from the inner end of the bore 30 is also ovular in configuration.

Seated to overlie the surface 22 and the innermost end of the bore 30 is a thin tongue-like valving element 38 formed of plastic material, the base of which is at what might be considered the upper and outer portion of the surface 22. The uppermost portion of the element 38 is superposed by a narrow, transversely coextensive, relatively rigid plastic block 40. The uppermost portion of the inclined surface 22 is provided with a pair of laterally spaced recesses 42 which are molded therein to be rectangular in cross section and adapted in dimension to receive and anchor therein the leading ends of fasteners, such as screws, plugs or the like, which may be applied through aligned apertures in the block 40 and the underlying end of the flapper 38. As so anchored, the portion of the tongue-like element 38 which extends downwardly from its base is such to overlie the surface 22 to a location adjacent the ribs 24. The arrangement is such that in absence of air being delivered through the bore 30 the valving element 38, which is relatively light in weight and constituted to be a reed type flapper, will bias to and seat coextensively with that portion of the surface 22 thereunder and to the outermost edge portions of the partitions 34, as well. This last prevents insuction of a portion of the valving element into the bore 30 in the function of the diffuser of which the frame forms a part.

The material and arrangement of the element 38 is such to essentially limit its flexing to a direction which corresponds to the direction of fluid flow through the bore 30. The flapper type valving element so provided is thus designed to function as a reed-type valving unit which insures that when fluid such as air is delivered by way of the bore 30, and in high velocity jets determined by the partition means 34, that the lower end of the valve 38, which offers little back pressure, will have a predetermined limited displacement assuring a controlled delivery of this air in its accelerated pressured flow. At the same time the flapper 38 is designed to inherently and adherently seat to the surface 22. In response to pressure applied at its surface innermost of the frame, or in absence of air flow, the element 38 will return to a firm seated and sealing relation across the surface 22. By reason of the base provided by the outer edges of the partitions 34 the seat is such to positively seal the discharge end of the bore 30.

Take particular note that the angle of inclination of the surface 22 inherently contributes to the optimal seal of the bore 30 by the valving element, the seating of which is assisted by gravity.

A further feature is found in the stream-lined feathered configuration of the partitions 34 at their ends innermost of the bore 30. As fluid such as air, under pressure, is directed through the bore 30 it is smoothly divided by the aerodynamic shape of the encountered partitions into the four jet passages 36. This provides that no turbulence of any consequence is introduced in the air flow, the function of which is enhanced by the fact that the reed type valving element offers little back pressure at the point of the air discharge from the passages 36.

Each of the end portions of the frame defined by the sections 16 and 18, respectively, embody a pair of integral, circumferentially extending, longitudinally spaced ribs 44, the purpose of which will soon be obvious.

To complete the diffuser assembly the frame 12 mounts a flexible rubber, synthetic rubber or plastic diffuser sleeve 46. The length of the sleeve 46 in this case is somewhat greater than that of the frame 12 and its respective extremities 48 are folded back on itself, in equal amount, to either end, as it is fit over the frame to extend from end to end thereof. The internal diameter of the flexible sleeve is such that its folded over ends seat about the frame end sections 16 and 18 and to their projected ribs 44. Clamps 50 are applied in encircling relation to each of the folded over layered ends of the sleeve 46 to clamp to and about the outer layer 48 and fix it to the layer thereunder and the layer thereunder in turn to the dual rib structure 44. Not only is each sleeve end thereby adhered in a sealing relation to the frame end thereunder but, in effect, spaced seals are optimally attained at and about the peaks of the ribs. Between the so anchored ends of the sleeve 46, the sleeve is slack in absence of internal pressure, in its unsupported area which lies opposite and (in use thereof) above the trough defined by the section 14. Thus, those portions of sleeve 46 adjacent the surfaces 20 and 22 at the portions thereof outermost of the trough will drop thereon to overlie the same as the portion of the sleeve therebetween drops inwardly of the frame towards the trough.

When air or other fluid under pressure is delivered by way of the bore 30 and jet passages 36, it will smoothly lift and pass under the lower tongue-like portion of the valving element 38 to fill the chamber defined between the sleeve and frame in the area of the trough. The sleeve will be pressured from its interior to assume a generally cylindrical shape and under pressure of a predetermined level to have the microscopic ruptures therein open and pass air to the exterior of the diffuser assembly so provided in the form of needle-like jets. The sleeve will remain expanded to its operating condition as long as the predetermined pressure is maintained. Note that pressure loss between the sleeve and the frame is fully inhibited in the invention construction.

More specifically, in use of a diffuser unit per the present invention, for example, in a body of liquid and solids for oxygenation purposes, the assembly will normally be disposed in a generally horizontal position with the section 14 of frame 12 to its bottom. An air supply line, connected to a source of supply, will have its delivery end coupled to the adapter 32. Air under pressure will then pass from the source of supply directly to and through the bore 30. In the course of its discharge the air will be broken up, as it impinges on the tapered aerodynamically shaped innermost edges of the partitions 34, into four fine, accelerated jet-like streams. These jets of air will exit from the bore 30 at the surface 22 to firmly and positively flex the free portion of the reed-like flapper element 38 slightly outward of the surface 22, and to smoothly and without turbulence be directed into the generally hemi-cylindrical trough 14. As the air moves into the diffuser chamber in this manner it quickly fills the same to the point the looseness of the sleeve 46 between the frame and portions 16 and 18 is overcome and this sleeve, between its ends, is billowed out to stretch into full cylindrical shape. As the inner surface of sleeve 46 is subjected to a predetermined pressure, the portions of the sleeve bordering the microscopic ruptures therein will stretch to produce needle sized openings in the sleeve, whereupon the air will issue to the liquid body about the diffuser in microscopic needle-like jets.

The portions of the sleeve outwardly to either end of the intermediate trough section 14 are imperforate. Therefore, with the ribbed construction of the frame end portions and the clamping of the folded over imperforate ends of the sleeve to the ribs, there is insured a positive seal between the sleeve and the frame, under the clamps 50. This precludes any leakage to or from the diffuser chamber between the ends of the sleeve and the frame. The net result is a maximum utilization of the pressure applied on delivery of the air to the diffuser chamber.

As will be seen, adverse wear and cutting or damaging of the sleeve by the clamp to the point of losing sleeve efficiency or its seal is obviated. There is optimal strength given the sleeve, as to its mount, and an assured pattern of flexing over a long period of time is also made possible in the double layered arrangement of the anchor portions of the sleeve.

Since the jets issuing from the sleeve are under maximum applied pressure in this case and quite needle-like, plugging is inhibited. When the air pressure or flow is terminated, the angularity or inclination of the surface 22 and the dependent overlay of the free tongue-like flap 38 creates a quick and positive seal of the discharge end of bore 30, assisted by gravity, in the process of which the outer ends of partitions 34 provide a backup load bearing surface for the flapper. This last prevents the flapper from being drawn into the bore and negating the seal. The net result of the valve disposition and construction is that if for any reason the sleeve should break not only will the flapper inherently seal the bore 30 fully but it will not flex so as to break the seal.

Attention is directed to the fact that the flapper 38 is of material to provide flexing only in the line of air flow and flexing without flutter.

The sleeve is made sufficiently loose of the frame between its anchored ends so that as the sleeve collapses in absence of suitable pressure on its interior surface, the portions over surfaces 20 and 22 will uniformly collapse thereon, under the influence of gravity, in the attitude described and here provided, whereupon the portion of the sleeve which settles on the surface 22 and the valve thereon will hold the valve flapper 38 down and exert thereby a doubling of the seal of the flapper to the surface 22 and across the discharge end of bore 30.

As seen, the frame is a one piece molded construction wherein all edges are smooth and rounded and it need not be subjected to drilling for application of screws or like fasteners. This insures a strength such as to make it virtually unbreakable unless subjected to severe misuse.

While the device of the invention has been described as being used to diffuse air, the gaseous fluid to be dispersed can, of course, be other than air.

In the embodiment herein illustrated, the arcuate cross section of the trough portion 14 of the frame is designed to have an extent slightly in excess of 180°. This contributes to a most effective body and support of the sleeve.

The foregoing embodiment evidences all of the improvements over the prior art first enumerated and avoids plugging and malfunction of the types indicated too often in course of the use of prior art structure having similar application.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Diffuser apparatus comprising a frame including end portions interconnected by and integrated with an elongate intermediate portion, said frame being adapted to mount a diffuser sleeve, said intermediate portion of said frame being reduced as to its cross sectional area as compared to that of said end portions so that in application of a sleeve to said frame it will define therewith a diffuser chamber, one of said end portions having an inlet passage for directing air under pressure to the diffuser chamber, the discharge end of which inlet passage is bridged by means forming a plurality of discharge openings which in the operative function of said apparatus are continuously open and arranged to produce a discharge therefrom of the air under pressure in a plurality of jet-like streams, the most adjacent ends of said end portions of said frame including facing surfaces one of which embodies the discharge extremities of said plurality of discharge openings and is oriented to incline to and outwardly from said intermediate portion of said frame and away from the facing surface of the remote end portion of said frame.

2. Diffuser apparatus as in claim 1 wherein both said end surfaces are inclined and diverge away and facing in a sense outwardly from said intermediate portion.

3. Diffuser apparatus as in claim 1 including a reed type flapper serving as a valving element connected to said one of said facing surfaces to have one end anchored thereto and a free end portion arranged inherently to overlie and seal said plurality of discharge openings in absence of a flow of fluid through said inlet passage under a predetermined level of pressure.

4. Diffuser apparatus as in any one of claims 1 and 3 wherein said intermediate portion is arcuate in cross section and the arcuate extent thereof is approximately 180°.

5. Diffuser apparatus as in any one of claims 1 and 3 wherein said frame mounts a diffuser sleeve the end portions of which are fixed in sealing relation to and peripherally of said frame end portions, said frame end portions being formed with circumferentially extending rib means within the portions of said sleeve which are fixed and said sleeve is provided with a multitude of normally sealed microscopic ruptures limited, as to their location, to the area thereof intermediate said frame end portions.

6. Diffuser apparatus as in claim 1 wherein said frame mounts a diffuser sleeve, said sleeve is longer than said frame and the excess length thereof is divided to be at both ends of said frame and the portion of said excess at each end of the frame is in each case folded back on and over adjacent portions of said sleeve which overlap and peripherally encompass said end portions of the frame, which embody therein peripherally arranged relatively projected rib means, and clamps are applied over the folded extremities of the sleeve to seal them to said frame and about the rib means thereof to prevent leakage to or from the chamber defined between the sleeve and said frame.

7. Diffuser apparatus as in claim 6 wherein said intermediate portion of said frame has longitudinally spaced drain holes and said sleeve is imperforate at locations outward of said intermediate portion of said frame, which it bounds.

8. Diffuser apparatus as in claim 7 wherein in use of said apparatus said intermediate portion of said frame is lowermost and said inlet passage is a bore the discharge end of which is bridged by intersecting partitions to produce said discharge openings which produce in turn said jet-like streams and the entrance end of said bore is extended by an adapter integral with said frame serving as means to which a supply line for air under pressure can be directly coupled.

9. Diffuser apparatus as in claim 1 wherein said frame is a one piece structure which embodies means for direct coupling thereto of a line for furnishing fluid under pressure and mounts a diffuser sleeve the end portions of which are clamped to the frame end portions, said frame end portions have longitudinally spaced circumferential ribs to which the sleeve end portions are sealingly clamped, and the adjacent end surfaces of said end portions are inclined at a 45° angle to the bottom of said intermediate portion, which is trough shaped and provided at its interior surface with ribs which extend from one of said facing surfaces substantially one half the length of said intermediate portion, and said facing surfaces are inclined at an approximately 45° angle to said trough.

10. Apparatus as in claim 9 wherein in use thereof said intermediate portion is lowermost and a reed type valve overlies the discharge end of said inlet passage so arranged as to effect a seal of said discharge end by gravity.

11. Diffuser apparatus according to claim 1 including gravity responsive means controlling flow through said discharge openings, said gravity responsive means tending normally to close said discharge openings and responding to the pressure of air applied in said inlet passage to clear said gravity responsive means and provide that said discharge openings are unobstructed.

12. Diffuser apparatus comprising a unitary frame presenting longitudinally spaced apart end portions and an interconnecting trough-like portion, said frame being adapted to mount a diffuser sleeve forming with said end portions and said trough-like portion a diffuser chamber, means for admitting air under pressure to said diffuser chamber, the construction of said apparatus providing for a directed release of air from said chamber outwardly of said trough-like portion through said sleeve, said means for admitting air including an air inlet passage in at least one of said end portions, an inner face of at least said one end portion being inclined relative to said trough-like portion and to said inlet passage, said inlet passage opening through said inclined face into the area which provides said diffuser chamber, and a flapper type valve element mounted to lie on said inclined inner face of said one end portion to cover said inlet passage and to utilize gravitational force in achieving a sealing contact with said face, said apparatus having a normal use attitude placing said trough-like portion of said frame lowermost and said inner face of said one end portion inclining upwardly from said trough-like portion in a direction away from the other end portion.

13. Diffuser apparatus as in claim 12, wherein said valve is anchored to said inclined inner face at a location above said inlet passage, a liftable part of said valve projecting toward said trough-like portion in a covering relation to said inlet passage.

14. Diffuser apparatus as in claim 13, wherein said inlet passage is formed with means approximately coincident with the plane of said inclined inner face providing for air discharge into said diffuser chamber in plural jets and providing support for said valve at the location of said inlet passage.

15. Diffuser apparatus as in claim 13, wherein a diffuser sleeve as mounted on said frame is made of a flexible, collapsible material, said sleeve in the absence of air pressure in said diffuser chamber collapsing on said inclined inner face in an overlying bearing relation to said valve.

16. Diffuser apparatus as in claim 15, wherein said end portions of said frame have cylindrical exteriors to which ends of said diffuser sleeve are clamped, said inclined inner face rising from said trough-like portion to merge with said cylindrical exterior of said one end portion, said cylindrical exteriors being formed with longitudinally spaced apart ribs of circumferential extent providing in the instance of each frame end portion plural longitudinally spaced apart locations having sealing contact with a respective sleeve end.

17. Diffuser apparatus as in claim 16, wherein ends of said sleeve are unapertured and turned over upon themselves whereby, where clamped to said frame, end portions of said sleeve ends have a double thickness.

18. Diffuser apparatus as in claim 15, wherein said frame end portions have the configuration of cylindrical bodies to exterior surfaces of which ends of said diffuser sleeve are clamped, each of said end portions having an inclined inner face and said faces inclining from said trough-like portion divergently of one another to provide support for a collapsing diffuser sleeve adjacent each end thereof.

19. Diffuser apparatus as in claim 18, wherein said frame is made in one piece as a plastic molding, cylindrical surfaces of said end portions and inclined inner faces thereof merging smoothly together in a manner to obviate undue stress on said sleeve.

* * * * *

UNITED STATES PATENT AND TRADEMARK OFFICE
CERTIFICATE OF CORRECTION

PATENT NO. : 4,243,616
DATED : January 6, 1981
INVENTOR(S) : Ronald Wyss

It is certified that error appears in the above—identified patent and that said Letters Patent is hereby corrected as shown below:

Column 8, line 3 (Claim 2, line 1) -- facing is inserted after "said";

Column 8, line 4 (Claim 2, line 2) "facing" is deleted;

Signed and Sealed this

Ninth Day of June 1981

[SEAL]

Attest:

RENE D. TEGTMEYER

Attesting Officer — Acting Commissioner of Patents and Trademarks